COMPUTER AND RECORDER
Filed Oct. 25, 1968 2 Sheets-Sheet 1
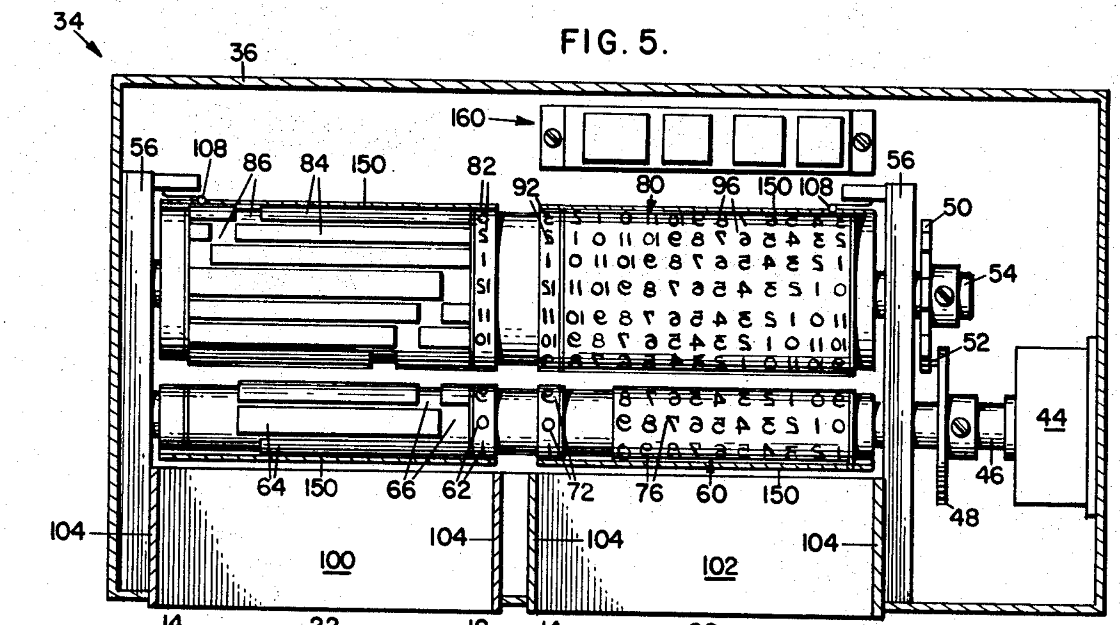
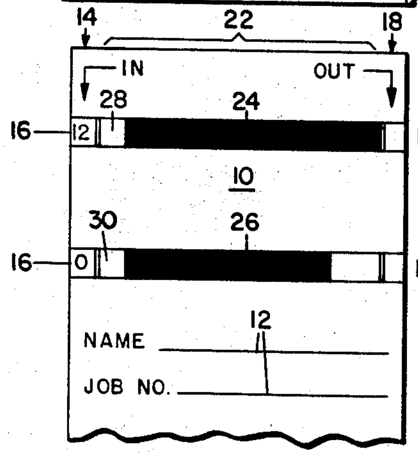
FIG. 2.
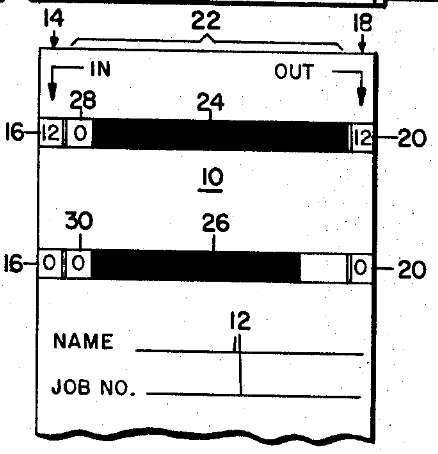
FIG. 3.
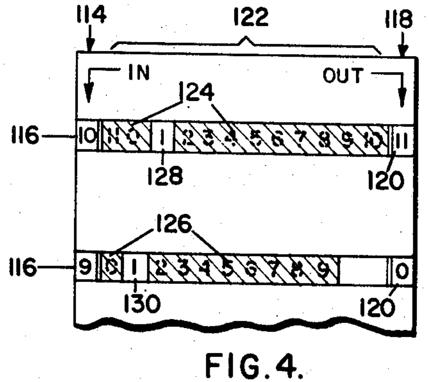
FIG. 4.
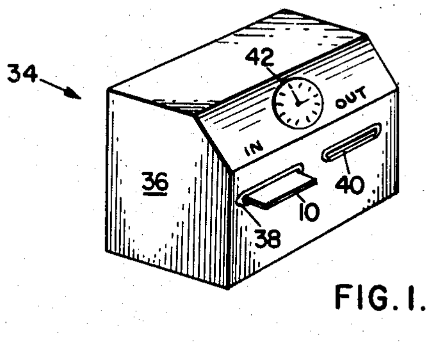
FIG. 1.
INVENTOR.
HANS WEISS
BY Kenwood Ross and
Chester E. Flavin
ATTORNEYS.

INVENTOR.
HANS WEISS
BY Kenwood Ross and
Chester E. Flavin
ATTORNEYS.

United States Patent Office 3,541,574

Patented Nov. 17, 1970

3,541,574

COMPUTER AND RECORDER

Hans Weiss, 23 Overbrook Road, Vernon, Conn. 06086

Filed Oct. 25, 1968, Ser. No. 770,727

Int. Cl. G07c *1/06*

U.S. Cl. 346—82 3 Claims

ABSTRACT OF THE DISCLOSURE

A computing and recording system including a record-receiver physically cooperant with an assemblage of clock-driven instrumentalities for stamping sets of impressions thereupon for delineating both the commencement of a measured time increment upon a first insertion of the record-receiver into the assemblage and the termination of the measured time increment and additionally the total time elapsed or monetary value or any other value of the time increment between time-increment-commencement and time-increment-termination upon a next sequential or second insertion of the record-receiver into the assemblage, with the elapsed time or monetary or other value computation and recordation being in accordance with a blanking out of certain areas of the record-receiver upon the first insertion so as to allow the reading, following the second insertion, of only appropriate impressions, the others being camouflaged.

THE PRIOR ART

Clipper-type time clocks comprise a case having a guideway usually vertically-oriented, into which a time card is adapted to be inserted. Stamping mechanism is operative, responsive to engagement of the card with a trigger extendable into the guideway, to stamp the time on the card for recording the times of arrival and departure of an employee to and from his place of employment or other time data with respect to a job or for similar purposes. A punch mechanism is operative, in response to successive card insertions, to punch out successive portions of a side edge of the card. Each such punching operation forms a shoulder edge on the card for engaging a trigger during the succeeding insertion of the card into the clock. During each card insertion, the card is pushed downwardly into the guideway until the previously-formed shoulder edge on the card engages the trigger, whereupon the stamping and punch mechanisms are simultaneously rendered operative to stamp the time on the card and to punch out a succeeding portion of the card respectively. During the next insertion, the card is lowered along the guideway a greater distance than during the next preceding insertion, according to the dimensions of the punched out portion, to the end that the stamping mechanism, stationarily-oriented relative to the trigger, stamps its indicia on a slightly different portion of the card area than that bearing the previously-stamped indicia. In the completed time card, therefore, the stamped time groups are formed, one directly above the other in a vertical row, the earliest time group appearing adjacent the bottom of the card and the latest time group appearing adjacent the top of the card, the number of time groups appearing depending upon the number of insertions of the card into the clock.

SUMMARY OF THE INVENTION

This invention teaches means for computing quantitative values, such as total time elapsed or money value or any other value of such time increment, by registering on a time card the commencement and termination of incremental changes in a mathematical progression and by recording the duration of the interval between such commencement and termination, or the money value or other value thereof, in the form of a computation.

A time clock mechanism successively records a punch-in time and a punch-out time and, upon the second recordation, additionally records the elapsed time between such events or any other appropriate quantitative value represented thereby. Therewith it is possible to record for further reference useful information with respect to such as the actual time consumed upon a particular job or the money value or other value thereof, additionally to recording the punch-in and punch-out times per se.

The invention envisions a timing mechanism which includes a pair of drums, each having time-in and time-out zones, and being movable rotatably and incrementally in manner to present different portions of their peripheral areas, representative of different time as time progresses, in record making position whereby, as the card to be imprinted with intelligence respecting the first time of insertion, called the commencement time or in-time, is inserted into a first-card-receiving area, a card-stamping device is activated so as to effect the imprinting of such intelligence on the card, and further whereby, as the previously-imprinted card is subsequently inserted into a second-card-receiving area, another card-stamping device is activated so as again to effect the imprinting of intelligence respecting the time of the second insertion, called the termination time or out-time, and also intelligence respecting the elapsed time or other value thereof between the first and second insertions.

As specifically exemplified, the invention is shown to permit the reading of time over a twelve hour time period, with each such hour being subdivided into tenths of an hour, but same is merely illustrative, the invention being adapted for use with any time period, such as for example, a twenty-four hour period, and further wherein each hour could be otherwise subdivided into, say, the sixty minutes of the hour, all depending upon the particular computing and recording purpose to be served. Any interval of time or any related value thereof desired to be measured could be recorded and thereby computed within the spirit and letter hereof.

DESCRIPTION OF THE DRAWINGS

FIG. 1 is a small scale view, in perspective, of the computing and recording mechanism;

FIG. 2 is a fragmentary view, in top plan, of the record-receiving card, same having been imprinted with stampings representative of a starting time following the first introduction thereof into and withdrawal from the mechanism at a punch-in time as well as wtih supplemental stampings in the form of markings serving to blank out or camouflage a certain area or areas;

FIG. 3 is a fragmentary view, in top plan, of the record-receiving card of FIG. 2, same having been next successively imprinted with stampings representative of a finishing time following the second introduction thereof into and withdrawal from the mechanism at a punch-out time as well as with other supplemental stampings so cooperant with the blanked out or camouflaged area or areas as to be representative of a total elapsed time or monetary value or other value thereof;

FIG. 4 is a fragmentary view, in top plan, of a record-receiving card, similar to that of FIGS. 2 and 3, but showing the disposition of the blanked out or camouflaged areas for a different time period, these blanked out areas being indicated by cross-hatching so as not to obsecure the numerals which would otherwise be completely concealed thereby;

FIG. 5 is a view, in top plan, of the recording and computing mechanism, with portions of the casing and record ribbons removed and the stamping mechanisms and clock omitted for clarity;

DESCRIPTION OF THE PREFERRED EMBODIMENT

Figure 6:
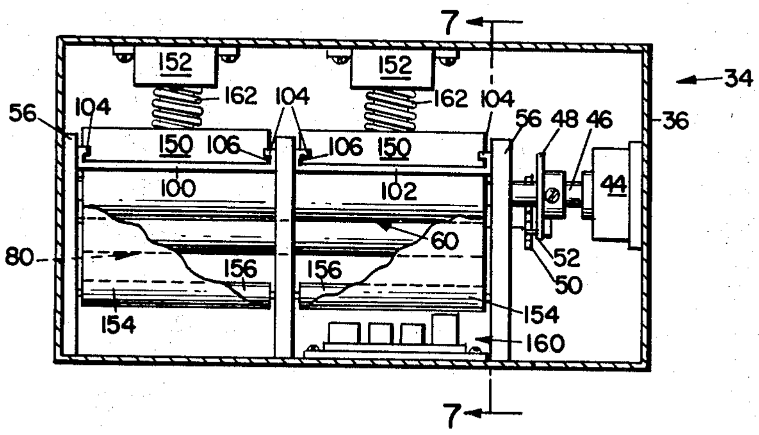
FIG. 6 is a small scale view, in front elevation, of the recording and computing mechanism, with a portion of the casing removed and with the record ribbons broken away for clarity.
Figure 7:
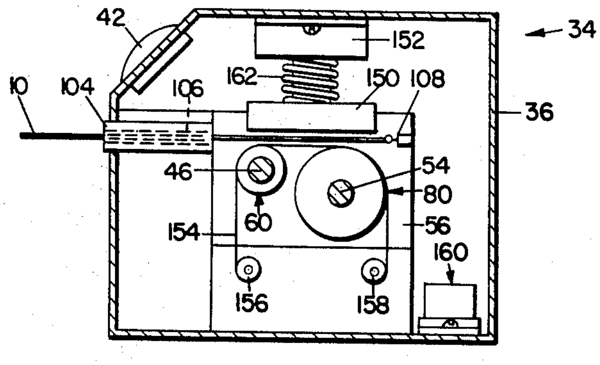
FIG. 7 is a small scale view, in section, on line 7—7 of FIG. 6.

The invention comprehends both a method and an apparatus for carrying out that method. The method is intimately related to the use of the apparatus, it being obvious that the commercial utility of the apparatus is rendered nugatory, if no satisfactory method is indicated for its use.

The invention, as shown, includes a record card 10, of a generally rectangular configuration, which is cooperant with a mechanism, generally indicated by 34, the one being dependent upon, and useless without, the other. Card 10 may be previously provided with certain preselected printed indicia thereupon in spaces 12 which may bear titles such as "Name," "Job Number," and like references, into which spaces appropriate intelligence may be manually entered preparatory to operational use.

In an outboard columnlike space 14, as viewed on the left of each card in FIGS. 2 and 3, and titled "In," representative of "Time-In," a pair of time-in blocks 16 are observable, in one of which appears the figure "12," representative of the twelfth hour of the a.m. or p.m., and in the other of which appears the figure "0," representative of the first tenth of that hour. The FIG. 2 card will be understood to have ben already inserted into mechanism 34 and to have received appropriate impressions as to record the fact in blocks 16 that the time-in insertion was made at the twelfth hour and during the first six minutes of that hour.

It is to be understood that, in the exemplication of the invention, the teenths of the hour impressions range from "0" to "9" inclusive, representative of the ordinals of 10 consecutive units of time, each in the form of a tenth of an hour (or six minutes), the first ordinal "0" representing a point in time less than the 6th minute of the hour and the last ordinal "9" representing a point in time between and inclusive of the 54th and 59th minutes of the hour.

In another outboard columnlike space 18, as viewed on the right of the card in FIG. 3, and titled "Out," representative of "Time-Out," a pair of time-out blocks 20 are observable, in one of which appears the figure "12," representative of the twelfth hour of the a.m. or p.m., and in the other of which appears the figure "0," representative of the first tenth of that hour. The FIG. 3 card will be understood to be the previously imprinted FIG. 2 card already inserted a second time into mechanism 34 and to have received additional appropriate impressions as to record the fact in block 20 that the time-out insertion was made at the twelfth hour and during the first six minutes of that hour.

Intermediate columnlike spaces 14 and 18 on opposite side edges of the card, a relatively wide central space 22, delineated the "elapsed time computing and recording space," is provided.

Between each time-in block 16 and its respective opposite and aligned time-out block 20, in the FIG. 2 card, a blacked-in stamping in the form of a printed bar is observed to have been imprinted, one designated by numeral 24, delineated the "hour computer bar" and one, designated by numeral 26, delineated the "tenths hour computer bar." Each such printed bar is observed to be broken by an adjacent blank space, the one adjacent printed bar 24 being numbered 28 and delineated a "computed hour space," and the one adjacent printed bar 26 being numbered 30 and delineated a "computed tenths hour space."

When card 10 is first inverted and inserted into the appropriate interior portion of mechanism 34, at a punch-in time the insertion produces energization of mechanism components such that the card is imprinted by stamping means with a first pair of stampings in the pair of blocks 16 unisonly recording a starting time in terms of the particular hour and the particular tenth of that hour. When next insert into the appropriate interior portion of the mechanism, at a punch-out time, the card is imprinted by other stamping means with a second pair of stampings in the pair of blocks 20 unisonly recording a terminating time in terms of the particular hour and the particular tenth of that hour.

Also, at the time of first insertion, the card is imprinted with hour and tenths hour computer bars 24 and 26 respectively, thereby defining computed hour and computed tenths hour spaces 28 and 30 respectively, all preparatory to the subsequent computing function.

Upon second insertion, the card is imprinted with two series of characters. In the case of one of the series, all but one of the characters are concealed or camouflaged from view, they being imprinted upon or over hour computer bar 24, and the remaining one character is readable, it being imprinted upon or over computed hour space 28, such readable delineation being representative of the elapsed time in terms of hours. In the case of the other of the series, all but one of the characters are concealed or camouflaged from view, they being imprinted upon or over tenths hour computer bar 26, and the remaining one character is readable, it being imprinted upon or over computed tenths hour space 30, such readable delineation being representative of the elapsed time in terms of tenths of that hour.

In FIG. 4 is shown a record card 110 wherein a different time-in and time-out have been selected to illustrate the different dispositions of the computer bars, which have been indicated by cross-hatching so as not to completely conceal or camouflage the numerals imprinted thereon at punch-out time.

In an outboard columnlike space 114, as viewed on the left of card 110, and titled "In," representative of "Time-In," a pair of time-in blocks 116 are observable, in one of which appears the figure "10," representative of the tenth hour of the a.m. or p.m. and in the other of which appears the figure "9," representative of the ninth tenth of that hour. The FIG. 4 card will be understood to have been inserted into mechanism 34 and to have received appropriate impressions as to record the fact in blocks 116 that the time-in insertion was made at the tenth hour and during the last six minutes of that hour.

In another outboard columnlike space 118, as viewed on the right of card 110, and titled "Out," representative of "Time-Out," a pair of time-out blocks 120 are observable, in one of which appears the figure "11," representative of the eleventh hour of the a.m. or p.m., and in the other of which appears the figure "0," representative of the first tenth of that hour. The FIG. 4 card will be understood to have been inserted into mechanism 34 and to have received additional appropriate impressions as to record the fact in blocks 120 that the time-out insertion was made at the eleventh hour and during the first six minutes of that hour.

In the FIG. 4 example, since less than an hour has elapsed between time-in and time-out, but because the time has moved from the tenth hour to the eleventh hour, it is necessary to subtract one hour from the total shown in space 128 to obtain the correct elapsed hour time of 0. This is the only instance in which such computation is necessary, however, the mechanism otherwise printing the exact elapsed time in hours in space 128.

Intermediate columnlike spaces 114 and 118 on opposite side edges of the card, a relatively wide central space 122, delineated the "elapsed time computing and recording space," is provided.

Between each time-in block 116 and its respective opposite and aligned time-out block 120, a blacked-in stamping in the form of a segmented printed bar is observed to have been imprinted, one designated by numeral 124, delineated the "hour computer bar" and one, designated by numeral 126, delineated by the "tenths hour computer bar." Each such printed bar, herein indicated by cross-hatching for clarity, is observed to be broken by an adjacent blank space, the one adjacent printed bar 124 being numbered 128 and delineated a "computed hour space," and the one adjacent printed bar 126 being numbered 130 and delineated a "computed tenths hour space."

Upon second insertion, the card is imprinted with two series of characters. In the case of one of the series, all but one of the characters are concealed from view, they being imprinted upon or over hour computer bar 124, and the remaining one character is readable, it being imprinted upon or over computed hour space 128 and such delineation is representative of the elapsed time in terms of hours. In the case of the other of the series, all but one of the characters are concealed from view, they being imprinted upon or over tenths hour computer bar 126, and the remaining one character is readable, it being imprinted upon or over computed tenths hour space 130 and such delineation is representative of the elapsed time in terms of tenths of that hour.

Mechanism 34, illustrated in FIG. 1 and FIGS. 5–7, is a card-cooperant-time-controlled mechanism, and includes a casing 36, provided on its front wall with an "In" slot in bezel 38 on the left side thereof and an "Out" slot in bezel 40 on the right side thereof, and also provided with a clock 42 nested within one of its walls.

Casing 36 incorporaes two work zones, a time-in zone on the left side and a time-out zone on the right side, as viewed in FIG. 5, serviced by the "In" and "Out" slots respectively.

The prime controller of the mechanism may consist of a conventional synchronous electric clock motor 44, or any other solenoid driven mechanism, mounted on one of the encasing walls and capable of effectiving incremental rotation of a drive shaft 46 each tenth of an hour. Drive shaft 46, serving as the tenths hour wheel shaft, is extendable across the casing width and mounts an annnular driving disc 48, which disc is intermittently intercoupled with a driven twelve-toothed gear 50 by a pin 52 projecting outwardly from the disc. Gear 50 is mounted on an hour wheel shaft 54 which is extendable across the casing width in spaced parallelism with tenths hour wheel shaft 46.

The outboard ends of each such wheel shaft 46 and 54 are journalled in brackets 56 at opposite sides of casing 36 and the wheel shafts are so intercoupled that the hour shaft is caused to rotate 360°, or one full revolution, each twelve hours in twelve equal incremental movements, as the tenths wheel shaft, driven by motor 44, rotates 360° or one full revolution every hour in ten equal incremental movements. These incremental movements are preferentially rapid and positive so as not to interfere unduly with the recording process.

Pin 52 and its supporting driving disc 48 move in manner such that, as the disc rotates one revolution every hour in ten incremental movements, the pin intermittently engages in one of the tooth spacings of driven gear 50 so as to drive that gear and its hour wheel shaft 54 rotationally one increment each hour and one complete revolution each twelve hours.

Tenths wheel shaft 46 mounts an elongate tenths hour drum 60, which drum is provided on its periphery, at its left hand side as viewed in FIG. 5, with a series of ten equi-spaced, circumferentially-arranged, outwardly-projecting or raised printing characteris in the form of ordinals from "0" to "9," called the "In-Time Printers" and identified by numeral 62, so arranged that one of the characters is in the uppermost, so-called 12 o'clock, printing position, character "0" being shown in such position in FIG. 5. The characters appear reversely on the drum in order to be imprinted properly on the card, the card being upside down for the imprinting and right side up for the subsequent reading thereof.

Outboard of and adjacent in-time printers 62 are ten longitudinally-extending, equi-spaced, peripherally-located series of raised or outwardly-projecting printing blank-out bars 64, each such bar being coaxially-arranged with respect to one of the in-time printers and each also being provided with an interruption in the form of a space or recess 66 so that, in the printing operation at punch-in time, that uppermost blank-out bar 64 which is in the 12 o'clock position is coaxially aligned with the uppermost in-time printer 62 and serves to cause an impression to be made on the card in the form of a tenths hour computer bar 26 across the card in elapsed time computing and recording space 22 and further to allow no impression to be made at computed tenths hour space 30 therealong complemental to space or recess 66.

The plurality of the recesses or spaces 66 on the drum are equi-spaced and spirally-arranged around the drum periphery so that for each different tenth of an hour, its respective recess is disposed at a different longitudinal position along the drum, the width of elapsed time computing and recording space 22 on card 10 being of such dimension as easily to accommodate ten computed tenths hour spaces 30 without any overlap and the width of the complemental portion on the drum being of such dimension as easily to accommodate ten such recesses or spaces 66 without any overlap.

At the opposite right hand side of drum 60 and on the periphery thereof is a series of ten equi-spaced, circumferentially-arranged raised or outwardly-projecting printing characters in the form of ordinals from "0" to "9," called the "Out-Time Printers" and identified by numeral 72, so arranged that one of the characters is ever in the uppermost, so-called 12 o'clock, printing position, character "0" being shown in such position in FIG. 5. Here again, the characters appear reversely on the drum.

Outboard of and adjacent such out-time printers 72 are ten longitudinally-extending, equi-spaced, peripherally-located series of raised characters called "Elapsed Time Printers," each series being identified by numeral 76, each series being coaxially-arranged with respect to one of the out-time printers 72.

Each series 76 comprises a plurality of equi-spaced characters from "0" to "9" and the plurality in each series are differently arranged so that any one character is located in a different position in each series longitudinally of the drum in manner such that an imaginary line drawn through that one character in each of the series defines a helix or spiral.

In the printing operation at punch-out time, that series 76 which is in uppermost, 12 o'clock, position, and as shown in FIG. 5, is coaxially ailgned with out time printers 72 in the form of character "0," serves to cause impressions to be made of each character in the series on card 10 across the card in elapsed time computing and recording space 22. However, only the impression of that character which lies within computed tenths hour space 30 will be readable, the other impressions being imprinted upon tenths hour computer bar 26 and being hence concealed from viewing.

Hour wheel shaft 54 mounts an elongate hour drum 80, which drum is provided on its periphery, at its left hand side as viewed in FIG. 5, with a series of twelve equi-spaced, circumferentially-arranged raised or outwardly-projecting printing characters in the form of ordinals from "1" to "12," called the "In-Time Printers" and identified by numeral 82, so arranged that one of the characters is ever in the uppermost, so-called 12 o'clock printing position, character "12" being shown in such position in FIG. 5. Here again, the characters appear reversely on the drum.

Outboard of and adjacent in-time printers 82 are twelve longitudinally-extending, equi-spaced, peripherally-located series of raised or outwardly-projecting printing blank-out bars 84, each such bar being coaxially-arranged with respect to one of the in-time printers and each also being provided with an interruption in the form of a space or recess 86 so that, in the printing operation at punch-in time, that uppermost blank-out bar 84, which is in the 12 o'clock position is coaxially aligned with the uppermost in-time printer 82 and serves to cause an impression to be made on card 10 in the form of an hour computer bar 24 across the card in elapsed time computing and recording space 22 and further to allow no impression to be made at computed hour space 28 therealong complemental to space or recess 86.

The plurality of the recesses or spaces 86 on the drum are equi-spaced and spirally-arranged around the drum periphery so that for each different hour, its respective recess is disposed at a different longitudinal position along the drum, the width of elapsed time computing and recording space 22 on the card being of such dimension as easily to accommodate twelve computed hour spaces 28 without any overlay and the width of the complemental portion on the drum being of such dimension as easily to accommodate ten such recesses or spaces 86 without any overlap.

At the opposite right hand side of drum 80 and on the periphery thereof is a series of twelve equi-spaced, circumfrentially-arranged raised or outwardly-projecting printing characters in the form of ordinals from "0" to "11," called the "Out-Time Printers" and identified by numeral 92, so arranged that one of the characters is ever in the uppermost, so-called 12 o'clock, position, character "12" being shown in such position in FIG. 5. Here again the characters appear reversely on the drum.

Outboard of and adjacent such out-time printers 92 are twelve longitudinally-extending, equi-spaced, peripherally-located series of raised characters called "Elapsed Time Printers," each series being identified by numeral 96, each series being coaxially-arranged with respect to one of the out-time printers 92.

Each series 96 comprises a plurality of equi-spaced characters from "0" to "11" and the plurality in each series are differently arranged so that any one character is located in a different position in each series longitudinally of the drum in manner such that an imaginary line drawn through that one character in each of the series defines a helix or spiral.

In the printing operation at punch-out time, that series 96 which is in uppermost, 12 o'clock, position, and as shown in FIG. 5, is coaxially aligned with out time printer 92 in the form of character "12," serves to cause impressions to be made of each character in the series on card 10 across the card in elapsed time computing and recording space 22. However, only the impression of that character which lies within computer hour space 28 will be readable, the other impressions being imprinted upon hour computer bar 24 and being hence concealed from viewing.

Numerals 100 and 102 denote a pair of plates, a time in plate and a time out plate respectively, which, cooperantly with guide walls 104 at the opposite side edges of each such plate, define guideways 106 for slideably receiving card 10 during time in and time out insertions respectively, the space between each pair of guideways being substantially equal to the width of the card.

The outboard end of each plate slightly extends through the respective benzel 38 or 40 to accommodate insertion of the card upon the upper planar surface of the plate and inwardly between the respetcive guide walls to its innermost record-receiving position.

At the inboard end of each allowed path of travel of card 10 upon insertion into the casing is a microswitch 108, and energization thereof ensues when the forwardmost card edge makes contact with the trigger thereof, the switch being suitably connected to a power supply.

Disposed above each of the drums, tenths hour drum 60 and hour drum 80, in the time-in area and in the time-out area respectively, is a solenoid-activated hammer 150 depending from a solenoid 152.

Disposed below the plane of each hammer, and below the plane of card 10, when in the impression-receiving position, and above the uppermost plane of the drums, is an intermediate reach of a carbon ribbon 154 which is looped over the drums and runs between spools 156 and 158, there being one such ribbon and a set of such spools for the time-in side and the time-out side of the apparatus.

The ribbons will run from one spool to the other and may be reversed by any well known reversing means.

The stamping mechanisms of the clock are operative in response to each insertion of the card into impression-receiving position to imprint the card with appropriate information, the time-in stamping mechanism being rendered operative when a card assumes the impression-receiving position in the time in section, the time out stamping mechanism being rendered operative when a card assumes the impression-receiving position in the time out section.

Operation of the stamping mechanism in response to insertion of card 10 into the casing is initiated by engagement of the card with a trigger of the microswitch, the trigger having one end projecting across the path of the card and comprising the actuating element of a normally-open microswitch which is arranged to be closed in response to inward depression of the trigger by a card. The stamping mechanism is in circuit with and operated by closure of the microswitch, suitable relays 160 being provided for that purpose.

The hammer is capable of axial movement downwardly toward the card by means of a solenoid which, when energized, is capable of driving the hammer so as to bring the card to bear tightly against the carbon ribbon and the appropriate character and/or bars of the drum thereunder and is returnable to normal non-operative position by means of a return spring 162 when the solenoid is de-energized.

The solenoid is in circuit with the microswitch and is energized, simultaneously with energization of the stamping means in response to move of the trigger.

Figure 8:
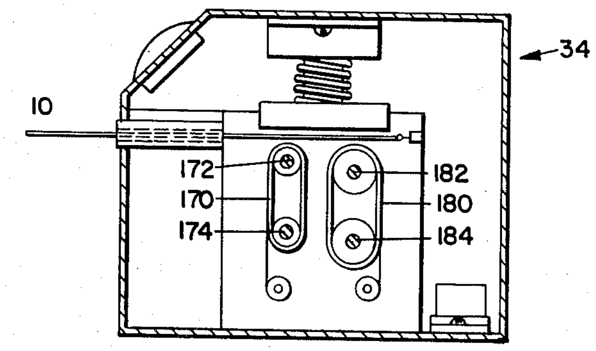
FIG. 8 is a small scale view, in section, similar to FIG. 7, showing a modified form of the invention.

In FIG. 8 is shown a modified form of the invention wherein an endless belt 170, entrained about pulleys 172 mounted upon shafts 174, one of which is driven, is substituted for tenths drum 60 and an endless belt 180, entrained about pulleys 182 mounted upon shafts 184, one of which is driven, is substituted for hour drum 80.

These belts will carry the same series of raised or outwardly projecting characters, raised or outwardly-projecting blank-out bars and recesses or spaces, none of which are shown, as are carried by the respective drums.

I claim:

1. Apparatus for producing on a record card a pattern of a value of time elapsed between a starting time and a finishing time, comprising,
   - a clock-operated time-in subassembly including a time-in drum having certain peripheral areas carrying indicia representative of different times as time progresses and certain other peripheral areas carrying intermittent camouflaging portions,
   - the time-in drum being incrementally rotatable for moving the indicia of the certain peripheral areas and for moving the intermittent camouflaging portions into and out of contacting position with the record card,
   - and a card stamping means controlled by and responsive to the relative positions of the time-in drum and the record card and being energizable for the stamping of the record card with certain of the indicia on the time-in drum being imprinted on the record card for indicating the starting time and the intermittent camouflaging portions on the time-in drum being imprinted on the record card for obscuring intermittent portions of the record card, and a clock-operated time-out subassembly including a time-out drum having peripheral areas carrying indicia representative of different times as time progresses, the time-out drum being incrementally rotatable for moving the peripheral indicia into and out of contacting position with the record card, and a card stamping means controlled by and responsive to the relative positions of the time-out drum and the record card and being energizable for the stamping of the record card with the indicia on the time-out drum being imprinted on the record card and with certain of the indicia appearing in unobscured portions of the record card and with other of the indicia being overprinted in non-readable manner on the obscured portions of the record card and with the finishing time and elapsed time being imprinted in the unobscured portions of the record card.

2. Apparatus according to claim 1, wherein the clock-operated time-in subassembly includes a pair of time-in drums each having certain peripheral areas carrying indicia representative of different times as time progresses and each having certain other peripheral areas carrying intermittent camouflaging portions, the time-in drums being incrementally rotatable for moving the indicia of the certain peripheral areas and for moving the intermittent camouflaging portions into and out of contacting position with the record card, and wherein the clock-operated time-out subassembly includes a pair of time-out drums each having peripheral areas carrying indicia representative of different times as time progresses, the time-out drums being incrementally rotatable for moving the peripheral indicia into and out of contacting position with the record card.

3. Apparatus according to claim 2, wherein the indicia carried by the pairs of both the time-in and time-out drums are representative of predetermined numbers of increments of an hour and predetermined numbers of an hour.

References Cited

UNITED STATES PATENTS

| | | | |
|---|---|---|---|
| 1,151,516 | 8/1915 | Engle | 346—60 |
| 2,454,711 | 11/1948 | Odell | 346—104 |
| 2,496,686 | 2/1950 | Williams | 346—82 |
| 2,874,020 | 2/1959 | Esler | 346—85 |

JOSEPH W. HARTARY, Primary Examiner

U.S. Cl. X.R.

346—95